US008284019B2

(12) United States Patent
Pishva

(10) Patent No.: US 8,284,019 B2
(45) Date of Patent: Oct. 9, 2012

(54) SPECTROSCOPIC METHOD AND SYSTEM FOR MULTI-FACTOR BIOMETRIC AUTHENTICATION

(76) Inventor: Davar Pishva, Beppu (JP)

( * ) Notice: Subject to any disclaimer, the term of this patent is extended or adjusted under 35 U.S.C. 154(b) by 355 days.

(21) Appl. No.: 12/450,653

(22) PCT Filed: Mar. 8, 2007

(86) PCT No.: PCT/JP2007/060168
§ 371 (c)(1),
(2), (4) Date: Oct. 5, 2009

(87) PCT Pub. No.: WO2008/139631
PCT Pub. Date: Nov. 20, 2008

(65) Prior Publication Data
US 2010/0141380 A1    Jun. 10, 2010

(51) Int. Cl.
*G05B 19/00* (2006.01)
(52) U.S. Cl. ...................................... 340/5.2
(58) Field of Classification Search ............ 382/115, 382/124, 100; 600/476, 310, 318; 356/71, 356/301; 348/218.1; 340/5.2
See application file for complete search history.

(56) References Cited

U.S. PATENT DOCUMENTS

| 5,652,653 | A | * | 7/1997 | Alsmeyer et al. | 356/301 |
|---|---|---|---|---|---|
| 5,978,021 | A | * | 11/1999 | Kim | 348/218.1 |
| 6,381,339 | B1 | * | 4/2002 | Brown et al. | 382/100 |
| 6,961,599 | B2 | * | 11/2005 | Lambert et al. | 600/318 |
| 7,288,106 | B2 | * | 10/2007 | Heacock et al. | 607/88 |
| 7,620,212 | B1 | * | 11/2009 | Allen et al. | 382/115 |
| 7,787,110 | B2 | * | 8/2010 | Raguin et al. | 356/71 |
| 2002/0183624 | A1 | * | 12/2002 | Rowe et al. | 600/476 |
| 2003/0044051 | A1 | * | 3/2003 | Fujieda | 382/124 |
| 2006/0056661 | A1 | * | 3/2006 | Einighammer et al. | 382/115 |

* cited by examiner

*Primary Examiner* — Jennifer Mehmood
*Assistant Examiner* — Kaleria Knox

(57) ABSTRACT

A multi-factor biometrics authentication method including the steps of: acquiring a non-spectrometric biometric signature (e.g. fingerprint, iris pattern, etc.) of a biometric signature source (e.g. fingertip, iris, etc.) of a subject to be authenticated (e.g. person); acquiring spectral information (e.g. diffuse reflectance spectrum, reflectance spectrum, etc.) of the biometric signature source; using the non-spectrometric biometric signature to determine the unique identity of the biometric signature source; and using the spectral information to verify that the subject to be authenticated belongs to a predetermined class of objects (e.g. living persons). A biometrics system (e.g. fingerprint authentication device, iris pattern authentication device) is augmented with spectral biometrics capability in a practical manner without introducing much overhead to the base biometrics technology or inconvenience to users.

8 Claims, 5 Drawing Sheets

SPECTROSCOPIC METHOD AND SYSTEM FOR MULTI-FACTOR BIOMETRIC AUTHENTICATION

TECHNICAL FIELD

This invention relates to a spectroscopic method and system for preventing spoofing of biometric authentication. Traditional biometric authentication systems use a person's fingerprint, hand geometry, facial features, retinal print, iris pattern, etc., for identification or authentication purposes. The process usually involves acquiring a biometric signature, such as an image of a fingerprint or other biological trait, extracting useful features from the image, and comparing these features with database values of previously extracted features. Such systems, however, can be spoofed, and to give examples, artificial fingers can be used on a fingerprint system, or a high resolution picture can be used on a face recognition system. A focus of this invention is to enhance biometrics authentication with a spectroscopic method in a multi-factor manner such that a person's unique 'spectral signatures' or 'spectral factors' are recorded and compared in addition to a non-spectroscopic biometric signature to reduce the likelihood of imposter getting authenticated.

BACKGROUND ART

Numerous technologies are available for automatic verification of a person's identity. The authentication process usually involves verification of what a person knows (e.g., passwords, pass phrases, PINs), has (e.g., tokens, smart cards), is (e.g., fingerprint, hand geometry, facial features, retinal print, iris pattern), or generates (e.g., signature, voice). Use of something known by a person and use of something held by a person are two simple identification/verification solutions widely used today. Biometrics (also known as biometry) is defined as 'the identification of an individual based on biological traits, such as fingerprints, iris patterns, and facial features,' and relies on what a person is or can generate.

Using something one knows requires only a good memory, but can on the other hand be easily overheard, seen, or even guessed. An item that one holds can be stolen and used or copied later. Using biometrics might at first seem to overcome these problems since fingerprints, iris patterns, etc. are part of one's body and thus not easily misplaced, stolen, forged, or shared. Indeed, biometrics technology is becoming a preferred standard for identification and authentication in ATMs, credit card transactions, electronic transactions, e-passports, airports, international borders, nuclear facilities and other highly restricted areas. Ironically however, this widespread acceptance of biometrics technology has been attracting the attention of attackers and has provoked interest in exploration of spoofing mechanisms against biometric systems. For example, the thousands of fingerprints that one leaves everywhere in one's daily life can be recovered and molded into artificial fingers for fooling biometrics devices based on fingerprint detection. In an experiment conducted by Matsumoto et al., eleven optical and silicon fingerprint sensors accepted artificial fingers in at least sixty percent of attempts (Tsutomu Matsumoto, Hiroyuki Matsumoto, Koji Yamada and Satoshi Hoshino, 'Impacts of Artificial 'Gummy' Fingers on Fingerprint System', Optical Society and Counterfeit Deterrence Techniques IV, Proceedings of SPIE, 4677, pp. 275-289, January 2002). Furthermore, with a commercially available high resolution digital camera, the iris pattern of a person's eye can be readily extracted from the person's facial picture and molded into contact lenses to be used to fool machines employing iris pattern recognition. An experiment conducted on two commercial iris recognition devices also showed that one of these devices could be fooled 50% of the time and the other 100% of the time '(Tsutomu Matsumoto, Masashi Hirabayashi and Kenji Sato, 'A Vulnerability of Iris Matching (Part 3)', Proceedings of the 2004 Symposium on Cryptography and Information Security, the Institute of Electronics, Information and Communication Engineers, pp. 701-706, January 2004).

Although susceptibility of most biometric system to spoofing have been experimented on fingerprint and iris recognition devices as these technologies are used in a variety of commercial products, other biometrics devices can also be spoofed, and to give examples, a dummy hand can be used on a hand geometry system, a high resolution picture can be used on a face recognition system, etc.

One way to counteract such spoofing is to augment a biometric identification means with an aliveness detection method for detecting that an object that is being presented to the biometric authentication system for authentication is not an artificial dummy but a part of a living person. For example, a fingerprint identification means may be augmented by a means that detects the blood pulse of a fingertip so that a fingertip that is presented for authentication can be judged to be that of a living person. However, even this method can be fooled, for example, by covering a living person's fingertip, which provides a pulse, with a thin, plastic-molded artificial fingertip that can provide an authentic fingerprint pattern.

DISCLOSURE OF INVENTION

Technical Problem

As can be understood from the abovementioned examples, many spoofing techniques against biometrics authentication systems make use of an artificial or non-human material, such as a plastic fingertip, contact lens, copy medium, etc., to provide a false biometric signature. In view of this, the present inventor considered that biometrics authentication systems can be significantly reinforced against spoofing by incorporating a means that enables judgment not simply of aliveness but judgment that an object being presented for authentication is a portion of a living human being that is free of any intervening artificial or prosthetic material.

An object of this invention is therefore to provide a method and a system that enhances existing biometrics technology with a spectroscopic method in order to prevent spoofing. It goes beyond the simple approach of aliveness detection and proposes the implementation of verification of 'spectral signatures' or 'spectral factors' that are unique to human beings or a predetermined class or group of human beings in addition to currently employed methodologies in a multi-factor manner to reduce the likelihood of an imposter getting authenticated. This invention also provides methods and systems that augment two widely used biometrics systems (fingerprint and iris recognition devices) with spectral biometrics capabilities in a practical manner and without creating much overhead or inconveniencing the users.

Technical Solution

In order to achieve the above objects, this invention proposes to augment a base authentication technique, such as optical fingerprint matching, in which a non-spectrometric biometric signature, such as a fingerprint image, is acquired from a biometric signature source, such as a fingertip, with a means of extracting spectral information from the same biometric signature source in a practical manner that does not affect the size, performance, cost, power requirements, operating environment, and human interaction requirements of the base authentication technique.

One aspect according to this invention provides: a multifactor authentication method including the steps of: acquiring a non-spectrometric biometric signature of a biometric signature source of a subject to be authenticated; acquiring spectral information of the biometric signature source; using the non-spectrometric biometric signature to determine the unique identity of the biometric signature source; and using the spectral information to verify that the subject to be authenticated belongs to a predetermined class of objects.

Here, the multifactor authentication method may further include the steps of: registering a non-spectrometric biometric signature of a biometric signature source of a subject to be authenticated; and registering spectral information of the biometric signature source; and in the step of using the non-spectrometric biometric signature to determine the unique identity of the biometric signature source, the acquired non-spectrometric biometric signature may be compared with the registered non-spectrometric biometric signature to determine the unique identity of the biometric signature source, and in the step of using the spectral information to verify that the subject to be authenticated belongs to the predetermined class of objects, the acquired spectral information may be compared with the registered spectral information to verify that the subject to be authenticated belongs to a predetermined class of objects.

Here, a 'non-spectrometric biometric signature' refers to an image, pattern, set of geometrical parameters, or other form of biological trait data obtained by an existing biometrics technology. Thus for example, the subject to be authenticated may be a person, and with this example, the predetermined class of objects may be 'living human beings with predetermined spectral characteristics,' the biometric signature source may be a fingertip, the non-spectrometric biometric signature may be a fingerprint image of the fingertip, and the spectral information of the biometric signature source may be a diffuse reflectance spectrum of the fingertip. That is, with this example, first, a fingerprint image of a person's fingertip is registered and a diffuse reflectance spectrum of the person's same fingertip is registered. Thereafter, a fingerprint image of a fingertip of a person, who is to be authenticated, is acquired, and a diffuse reflectance spectrum of this person's same fingertip is acquired. The acquired fingerprint image is then compared with the registered fingerprint image to determine the unique identity of the person, in other words, to determine that the fingerprint is that of the person to be authenticated, that is, the person whose fingerprint had been registered in advance and not that of anybody else, and the acquired diffuse reflectance spectrum of the fingertip is compared with the registered reflectance spectrum to verify that the person is actually a living human body with the predetermined spectral characteristics.

Here, because the non-spectrometric biometric signature, such as a fingerprint image, of the biometric signature source, such as the fingertip, is augmented by the spectral information of the biometric signature source, such as the diffuse reflectance spectrum of the fingertip, so that while the non-spectrometric biometric signature (e.g. fingerprint image) ensures the unique identity of the object or the person to be authenticated, the spectral information (e.g. diffuse reflectance spectrum) ensures that the non-spectrometric biometric signature (e.g. fingerprint image) is a genuine signature of the predetermined class of objects (e.g. living human beings), spoofing, for example, that uses the non-spectrometric biometric signature (e.g. fingerprint image) formed on an object (e.g. copy medium, plastic finger, etc.) not belonging to the predetermined class of objects (e.g. living human beings) can be prevented. That is, the spectral information of an object reflects the optical complexity of that object, and the more complex an object is, the more complex the spectral information. In particular, skin or other portion of a living human is a complex biological structure made of different layers with distinct morphologies and optical properties. Thus for example, a diffuse reflectance spectrum obtained from a fingertip includes spectral components of such substances as melanin, hemoglobin, and other constituents of skin, muscle, blood, etc., with which the proportions present, etc. differ among individual persons. The spectral information obtained from a fingertip or other portion of a living human is thus extremely complex and cannot be replicated readily by the use of artificial dummies and prosthetic devices, and especially because in the present invention, the non-spectrometric biometric signature of the same portion is acquired for identification, spoofing is made a practically insurmountable task.

In the above example of spoofing using a fingertip image printed on a copy medium, because any copy medium is an artificial object, such as paper, plastic, etc., or in the least, a non-living object, such as non-living skin, it cannot provide the same spectral information as that of a portion of a living human being. If an imposter attaches a fingertip cover, which is molded to provide the image of an authentic fingerprint image, to his/her own fingertip, the detected spectral information may contain spectral information of the imposter's fingertip, which is spectral information of a living human being. However, as long as the fingertip cover that is attached is an artificial object, or in the least, a non-living object, the detected spectral information will contain spectral information that differs from that of a living human being and thus as a whole, the detected spectral information will not be the same as that of a living human being.

In the present invention, the spectral information is used to verify that the subject to be authenticated belongs to a predetermined class of objects. The predetermined class of objects is preferably broad enough to provide allowance for intra-object variations and yet narrow enough to preclude spoofing. In the above example, 'living human beings with predetermined spectral characteristics' is the predetermined class of objects, and this allows for intra-personal variations due to such external conditions as injury and exposure to high or low temperatures, chemicals, ultraviolet rays, or such internal conditions as changes in blood flow due to consumption of medicine, alcohol, etc., and at the same time precludes the use of artificial and non-living-human objects for spoofing.

Here, the steps of acquiring the non-spectrometric biometric signature of the biometric signature source of the subject to be authenticated and acquiring the spectral information of the biometric signature source may be carried out simultaneously. This significantly shortens the time required for authentication.

In the step of comparing the acquired spectral information with the registered spectral information to verify that the subject to be authenticated belongs to the predetermined class of objects, cluster analysis may be performed on the acquired spectral information and the registered spectral information to determine a similarity value of the acquired spectral information and the registered spectral information, and the subject to be authenticated may be verified as belonging to the predetermined class of objects when the determined similarity value is within a predetermined range.

Another aspect according to this invention provides: a multifactor authentication system including: a means for acquiring a non-spectrometric biometric signature of a biometric signature source of a subject to be authenticated; a means for acquiring spectral information of the biometric signature source; and a means that uses the non-spectrometric biometric signature to determine the unique identity of the biometric signature source and uses the spectral information to verify that the subject to be authenticated belongs to a predetermined class of objects.

Here, the multifactor authentication system may further include: a means for storing an acquired non-spectrometric biometric signature as a registered non-spectrometric biometric signature and storing an acquired spectral information as registered spectral information; and the means that uses the non-spectrometric biometric signature to determine the unique identity of the biometric signature source and uses the spectral information to verify that the subject to be authenticated belongs to a predetermined class of objects may compare a newly acquired non-spectrometric biometric signature with the stored, registered non-spectrometric biometric signature to determine the unique identity of the biometric signature source and compare newly acquired spectral information with the stored, registered spectral information to verify that the subject to be authenticated belongs to a predetermined class of objects.

In the above-described example where the subject to be authenticated is a person, the predetermined class of objects is 'living human beings with predetermined spectral characteristics,' the biometric signature source is a fingertip, the non-spectrometric biometric signature is a fingerprint image of the fingertip, and the spectral information of the biometric signature source is a diffuse reflectance spectrum of the fingertip, the means for acquiring the non-spectrometric biometric signature may be a CCD or CMOS detecting system, with which an image of the fingerprint is formed on a detecting surface of a CCD or CMOS sensor, the means for acquiring the spectral information may be a photodiode array (PDA) detecting system, with which diffusely reflected light from the fingertip is spectrally dispersed onto a PDA, and a computer or other information processing means may be used as the means that uses the fingerprint image (non-spectrometric biometric signature) to determine the unique identity of the fingertip (biometric signature source) and uses the spectral information to verify that the person (subject to be authenticated) is a 'living human being with predetermined spectral characteristics' (belongs to the predetermined class of objects).

Here, a half-mirror or a beam splitter may be used to simultaneously acquire the non-spectrometric biometric signature (e.g. fingerprint image) and the spectral information (e.g. diffuse reflectance spectrum), and an extended portion of the CCD/CMOS detector may be configured as PDAs for simultaneously capturing numerous identical spectra to be integrated into a single spectrum having a sufficient S/N ratio for spectral analysis. The system can thereby be made compact and high in the speed of authentication.

ADVANTAGEOUS EFFECTS

BEST MODE

Figure 1:
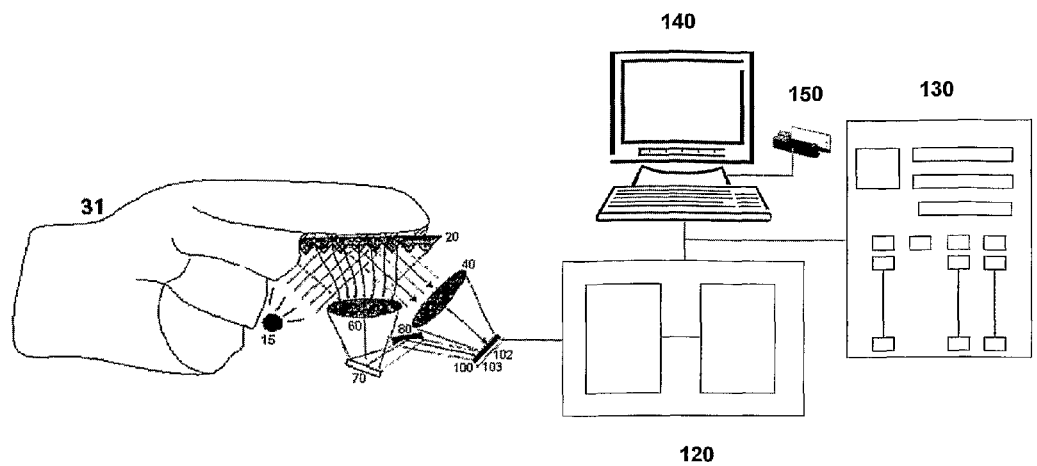
FIG. 1 is a schematic diagram of a basic arrangement of a spectral biometrics enhanced authentication system according to a first embodiment of this invention.

Preferred embodiments of this invention shall now be described. FIG. 1 is a schematic diagram of a basic arrangement of a spectral biometrics enhanced authentication system according to a first embodiment of this invention, which is a fingerprint authentication device that authenticates a person's identity based on his/her fingerprint and biospectral characteristics of his/her finger.

Figure 2:
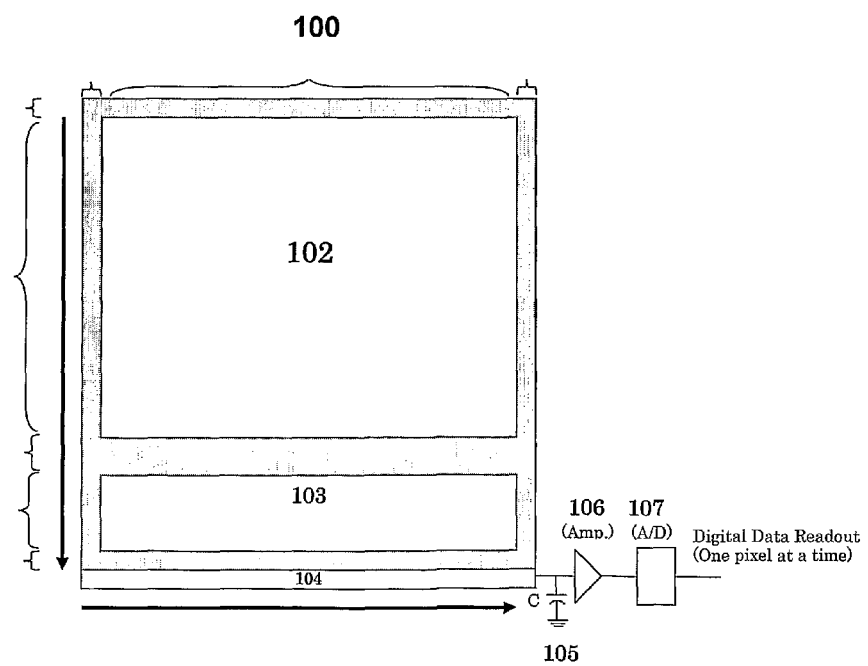
FIG. 2 is a schematic diagram of a CCD (image sensor) in the spectral biometrics enhanced authentication system according to the first embodiment.

As shown in FIG. 1, this fingerprint authentication device 1 includes a measurement unit 2, a controller 120, a memory (storage device) 130, and a monitor 140. The measurement unit 2 includes an optical system 10 and a CCD (charge coupled device; image sensor) 100. The optical system 10 includes an I2 lamp (light source) 15, a sheet prism (prism means) 20, a first lens 40, a second lens 60, a mirror 70, and a diffraction grating 80. As shown in FIG. 2, the CCD 100 is an image sensor with pixels arranged in 1280 rows and 1024 columns and has an image acquisition portion 102 (first portion of a detecting surface of the CCD sensor), which is a region of 960×960 pixels at an upper portion of the CCD 100 that excludes the pixels of 32 edge rows at the top side and 32 columns at each of the left and right sides of the CCD 100 as boundary pixels, and a spectrum acquisition portion 103 (second portion of a detecting surface of the CCD sensor), which is a region of 160×960 pixels at a lower portion of the CCD 100 that excludes the pixels of 32 edge rows at the bottom side and 32 columns at each of the left and right sides of the CCD 100 as boundary pixels. 96 rows of pixels between the image acquisition portion and the spectrum acquisition portion 103 are also handled as boundary pixels. The controller 120 is electrically connected to the CCD 100, the memory 130, and the monitor 140 and controls operations of these components by issuing appropriate instruction signals. The memory 130 has a measured image (matrix) storage area 132, a reference spectrum (vector) storage area 133, a measured spectrum (vector) storage area 134, a reduced measured spectrum (vector) storage area 135, registered image pattern (template) storage areas $136_1$ to $136_n$ (where n is an integer greater than 1), registered spectral template data storage areas $137_1$ to $137_n$, an identity storage area 138, and registered identity storage areas $139_1$ to $139_n$. The controller 120 is also electrically connected to a card reader 150 that serves as an identity inputting means.

A manner in which a fingerprint image is acquired as a non-spectrometric biometric signature of a fingertip (biometric signature source) of a person (subject to be authenticated) and a diffuse reflectance spectrum of the fingertip is acquired as spectral information of the fingertip (biometric signature source) by this fingerprint authentication device 1 shall now be described.

As shown in FIG. 1, with this fingerprint authentication device 1, light from the I2 lamp 15 is made incident via a sheet prism 20 onto a finger 31₁, which belongs to a person 30₁ to be authenticated and is being pressed against an upper surface of the sheet prism 20. A portion of the light made incident on the finger 31₁ is reflected as a specular reflection component Ls from the surface of the finger 31₁, and a first lens 40 forms an image of this specular reflection component Ls on the image acquisition portion 102 of the CCD 100.

Figure 3:
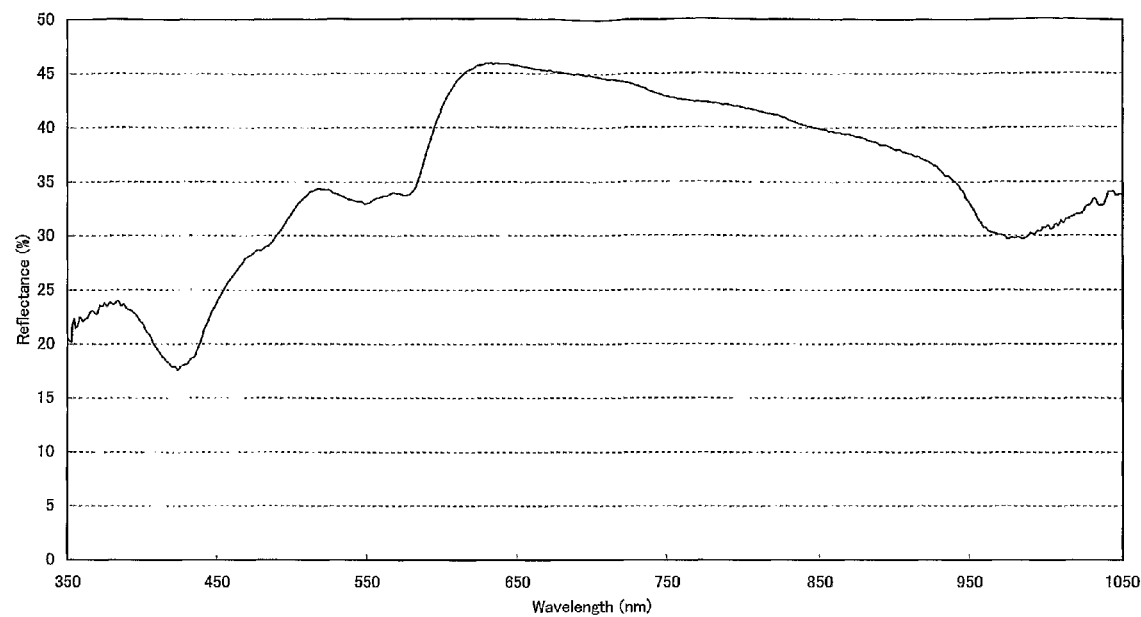
FIG. 3 is a diffuse reflectance spectrum of a fingertip.

Another portion of the light made incident on the finger 31₁ penetrates into the skin, is refracted, reflected, absorbed, or re-emitted as fluorescence or phosphorescence, etc. by internal tissue, blood, and other various physiological components inside and below the skin, and some of this light ultimately returns to the surface and exits from the skin in various directions, thus forming a diffuse reflection component Lb. Because this light component results from light that has traveled inside the skin, it carries information concerning the person's skin color and his/her unique biological 'spectral signature' (FIG. 3). After exiting from the skin, the diffuse reflection component Lb passes through the sheet prism 20 and is converged, via the second lens 60 and the mirror 70, onto the diffraction grating 80, which spectrally disperses and makes the diffuse reflection component Lb incident on the spectrum acquisition portion 103 of the CCD 100 in a manner such that a fingertip diffuse reflection spectrum of a range of 350 nm to 1050 nm is acquired from each row of the spectrum acquisition portion 103.

Light made incident on the CCD 100 is photoelectrically converted into electrical charges at the respective pixels. In accordance to an instruction signal from a measurement controlling unit 122 of the controller 120, these charges are electronically shifted into a horizontal shift register 104, one row at a time, and thereafter, the contents of the horizontal shift register 104 are shifted, one pixel at a time, into a capacitor 105. The charges in the capacitor 105 are then provided as an analog voltage to an amplifier 106, which performs amplification to an appropriate analog voltage level (e.g., 0 to 10 volts). The amplified voltage output by the amplifier is then converted to a digital value by an analog-to-digital (A/D) converter 107. The digital values output by the A/D converter 107 are then input as data into the memory 130 according to instruction signals from the measurement controlling unit 122 of the controller 120. The digital values obtained by reading the charges from the image acquisition portion 102 of the CCD 100 are thus stored as data in the measured image storage area 132 in accordance to an instruction signal from the controller 120, and the digital values obtained by reading the charges from the spectrum acquisition portion 103 of the CCD 100 are binned as data in the measured spectrum storage area 134 in accordance to an instruction signal from the measurement controlling unit 122 of the controller 120.

In this readout process, the data of the boundary pixels (i.e. the pixels of the 32 edge rows at the top and bottom sides, the 32 columns at each of the left and right sides, and the 96 rows between the image acquisition portion 102 and the spectrum acquisition portion 103 of the CCD 100) are ignored as data that may not be reliable in comparison to data of other portions or as data that may be hybrid data of the image and the spectrum.

An authentication process using the fingerprint authentication device 1 shall now be described with reference to the flowcharts of FIGS. 4 and 5. This authentication process is constituted of an enrollment process (FIG. 4), in which a person's fingerprint image and fingertip diffuse reflectance spectrum are registered along with the person's identity, and a verification process (FIG. 5), which is performed each time a person needs to be verified.

Figure 4:
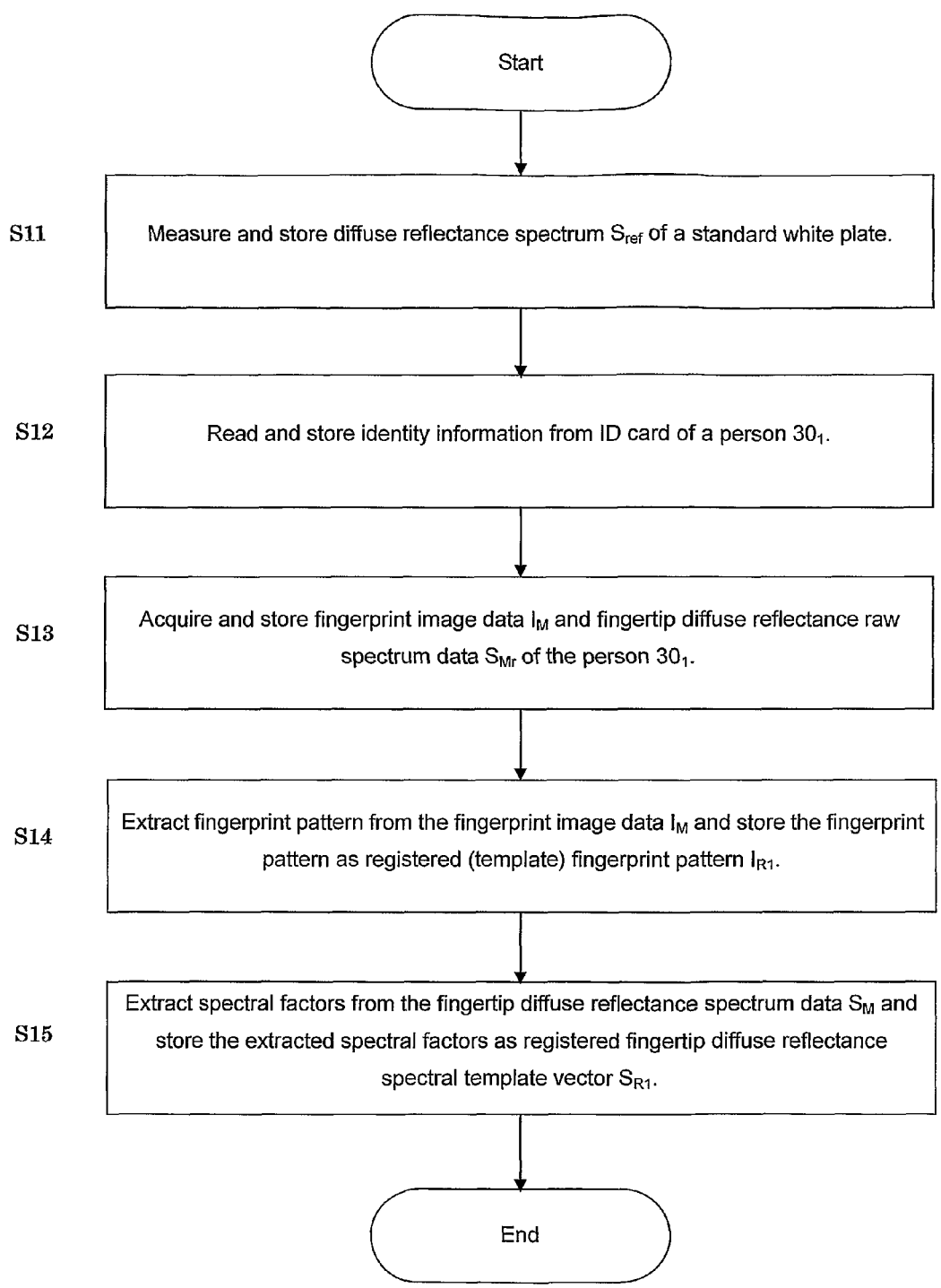
FIG. 4 is a flowchart of an enrollment process in an authentication process according to an embodiment of this invention.
Figure 5:
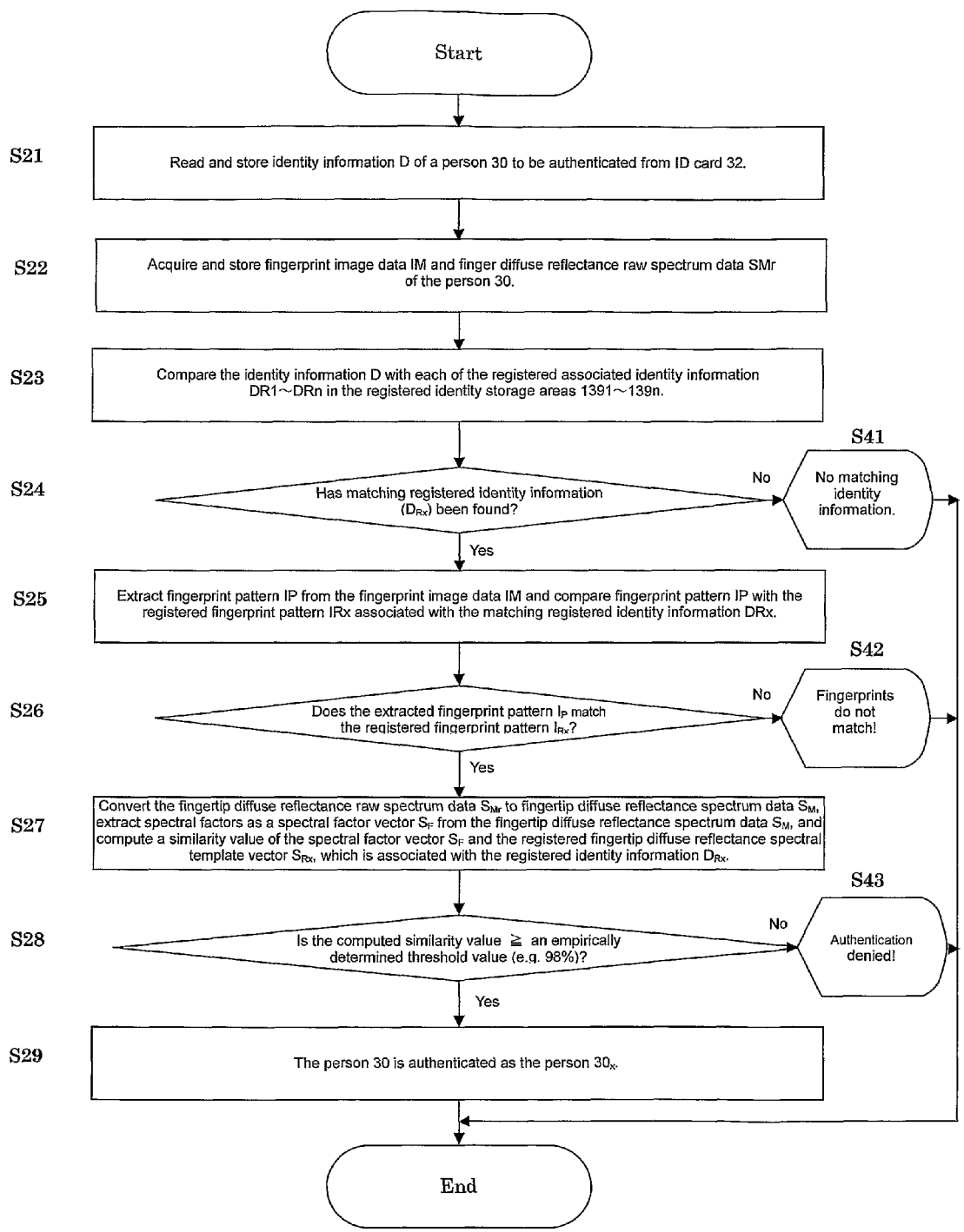
FIG. 5 is a flowchart of a verification process in the authentication process according to the embodiment of this invention.

Firstly, in the enrollment process, shown in FIG. 4, a diffuse reflectance spectrum $S_{ref}$ of a standard white plate (not shown) is set on the upper surface of the sheet prism 20 and its diffuse reflectance spectrum $S_{ref}$ is measured. The spectrum data $S_{ref}$ that are obtained by this measurement and stored in the measured spectrum storage area 134 of the memory 130 are then transferred and re-stored in the reference spectrum storage area 133 of the memory 130 (step S11).

Identity information, such as the name, etc. of the person 30₁, are then read from an ID card 32₁, belonging to the person 30₁, by means of the card reader 150 and stored as registered identity information $D_{R1}$ in the registered identity storage area 139₁ (step S12).

Fingerprint image data $I_M$ and fingertip diffuse reflectance raw spectrum data $S_{Mr}$ of the person 30₁ are then captured and measured as described above and stored in the measured image storage area 132 and the measured spectrum storage area 134, respectively, of the memory 130 (step S13).

The controller 120 then issues an instruction signal to the memory 130 to make the fingerprint image data $I_M$, stored in the measured image storage area 132, be transmitted to an analyzing unit 123, where a fingerprint pattern is extracted from the fingerprint image data $I_M$. Methods of extracting a fingerprint pattern from such fingerprint image data are well-known and described, for example, in 'Handbook of Fingerprint Recognition,' by Davide Maltoni, Dario Maio, Anil K. Jain, and Salil Prabhakar (Springer, 1st ed., 2005), and a detailed description thereof shall not be provided here. The controller 120 then stores the extracted fingerprint pattern, for example, as a registered (template) fingerprint pattern $I_{R1}$ in the registered image pattern (template) storage area 136₁ so that this fingerprint pattern is associated with the registered associated identity information $D_{R1}$ in the registered identity storage area 139₁ (step S14).

Figure 6:
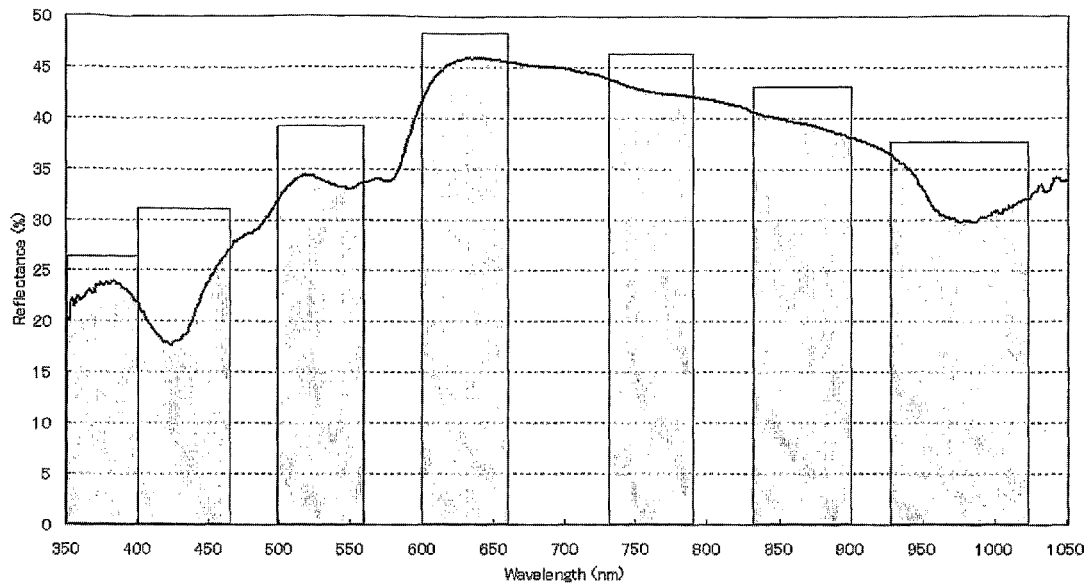
FIG. 6 is a diagram for describing how a fingertip diffuse reflectance spectral template vector is obtained from a diffuse reflectance spectrum.

Next, the controller 120 issues an instruction signal to the memory 130 to make the fingertip diffuse reflectance raw spectrum data $S_{Mr}$, stored in the measured spectrum storage area 134, and the reference reflectance spectrum data $S_{ref}$, stored in the reference spectrum storage area 133, be transmitted to the analyzing unit 123. In the analyzing unit 123, the fingertip diffuse reflectance raw spectrum data $S_{Mr}$ are converted to fingertip diffuse reflectance spectrum data $S_M$ by using the values of reference reflectance spectrum data $S_{ref}$ as 100% reflectance. Spectral factors are then extracted from the fingertip diffuse reflectance spectrum data $S_M$. In the present example, the fingertip diffuse reflectance spectrum data $S_M$ is integrated in the respective ranges of 350 to 400 nm, 401 to 470 nm, 500 to 560 nm, 600 to 660 nm, 730 to 790 nm, 830 to 900 nm, and 925 to 1025 nm to obtain seven integration values (FIG. 6). Here, the ranges of 350 to 400 nm and 401 to 470 nm correspond to peaks due to melanin, the ranges of 500 to 560 nm, 600 to 660 nm, and 830 to 900 nm correspond to peaks due to hemoglobin, the range of 730 to 790 nm corresponds to arterial blood, and the range of 925 to 1025 nm corresponds to venous blood. The resulting seven values are then stored as a registered fingertip diffuse reflectance spectral template vector $S_{R1}$ in the registered spectral template data storage area 137₁, and this spectral template vector is thereby associated with the registered associated identity information $D_{R1}$ in the registered identity storage area 139₁ (step S15).

This enrollment process is not performed each time a person needs to be authenticated but is performed just once or once every predetermined interval (months, years, etc.). Also, for persons besides the person 30₁, the procedure from step S12 to step S15 of this enrollment process may be performed at any time to register a registered fingerprint image $I_R$ and a registered fingertip diffuse reflectance spectrum $S_R$ in association with an associated identity information $D_R$ for each of an arbitrary number n of persons.

In the verification process (FIG. 5), first, the identity information of a person 30 to be authenticated are read from an ID card 32, belonging to the person 30, by means of the card reader 150 and stored as identity information D in the identity storage area 138 (step S21).

Fingerprint image data $I_M$ and fingertip diffuse reflectance raw spectrum data $S_{Mr}$ of the person 30 are then captured and measured as described above and stored in the measured image storage area 132 and the measured spectrum storage area 134, respectively, of the memory 130 (step S22).

The controller 120 then issues an instruction signal to the memory 130 to make the identity information D, stored in the identity storage area 138, be transmitted to the analyzing unit 123. At the analyzing unit 123, the identity information D is compared with each of the registered associated identity information $D_{R1}$ # $D_{Rn}$ in the registered identity storage areas $139_1$#$139_n$ to find matching registered identity information (step S23, S24). If a matching registered identity information is found, step S25 is entered. On the other hand, if matching registered identity information is not found, step S41 is entered, in which a message, such as 'No matching identity information,' is displayed on the monitor 140, and then the process is ended without authentication of the person 30.

For the present description, it shall be deemed that the identity information D matches the registered associated identity information $D_{Rx}$ of a person $30_x$ (where x is a value in the range of 1 to n). In this case, upon entering step S25, the controller 120 issues an instruction signal to the memory 130 to make the fingerprint image data $I_M$, stored in the measured image storage area 132, be transmitted to the analyzing unit 123, where a fingerprint pattern $I_P$ is extracted from the fingerprint image data $I_M$. At the analyzing unit 123, the extracted fingerprint pattern $I_P$ is compared with the registered fingerprint pattern $I_{Rx}$ in the registered image pattern storage area $136_x$, which is the fingerprint pattern associated with the registered identity information $D_{Rx}$, to judge whether the extracted fingerprint pattern $I_P$ matches the registered fingerprint pattern $I_{Rx}$ (step S26). Methods of comparing fingerprint patterns from such fingerprint image data are well-known and described, for example, in the abovementioned 'Handbook of Fingerprint Recognition,' and a detailed description thereof shall not be provided here.

If by the above analysis of step S26, the extracted fingerprint pattern $I_P$ is found to match the registered fingerprint pattern $I_{Rx}$, step S27 is entered. On the other hand, if the fingerprint patterns do not match, step S42 is entered, in which a message, such as 'Fingerprints do not match!' is displayed on the monitor 140, and then the process is ended without authentication of the person 30.

For the present description, it shall be deemed that the extracted fingerprint pattern $I_P$ matches the registered fingerprint pattern $I_{Rx}$. In this case, upon entering step S27, the controller 120 issues an instruction signal to the memory 130 to make the fingertip diffuse reflectance raw spectrum data $S_{Mr}$, which are of the person 30 and are stored in the measured spectrum storage area 134, and the reference reflectance spectrum data $S_{ref}$, which are stored in the reference spectrum storage area 133, be transmitted to the analyzing unit 123. In the analyzing unit 123, the fingertip diffuse reflectance raw spectrum data $S_{Mr}$ are converted to fingertip diffuse reflectance spectrum data $S_M$ of the person 30 by using the values of reference reflectance spectrum data $S_{ref}$ as 100% reflectance. Seven spectral factors are then extracted as a spectral factor vector $S_F$ from the fingertip diffuse reflectance spectrum data $S_M$ in the same manner as described above. A similarity value of the spectral factor vector $S_F$ thus acquired and the registered fingertip diffuse reflectance spectral template vector $S_{Rx}$ in the registered spectral template data storage area $137_x$, which is associated with the registered identity information $D_{Rx}$, is then computed by cluster analysis using single linkage Euclidean distance. The computation of the similarity value is performed, for example, using a cluster analysis software, such as Minitab Statistical Software© (made by Minitab Inc.), and using a seven-valued vector $R_0$, having zero entries for all seven spectral factors, as a dissimilarity reference vector corresponding to a similarity value of 39.11%. Because the computation of the similarity value by cluster analysis using single linkage Euclidean distance is a well-known art (see, for example, The Euclidean Distance Transform, Ingemar Ragnemalm, PhD Thesis, Linköping University, E.E.Dept., Dissertation #304), a detailed description thereof shall be omitted here.

The computed similarity value is then compared with, for example, an empirically determined threshold value of 98% (S28). If the computed similarity value is greater than or equal to this threshold value, the process ends upon authentication of person 30 as the person $30_x$ (step S29). On the other hand, if the computed similarity value is less than the threshold value, step S44 is entered, in which a message, such as 'Authentication denied!' is displayed on the monitor 140 and then the process is ended without authentication of the person 30.

As can be understood from the above description of the embodiment, with the present invention, because a non-spectrometric biometric signature (fingerprint image) of a biometric signature source (fingertip) is augmented by spectral information of the biometric signature source (diffuse reflectance spectrum of the fingertip) in a manner such that the non-spectrometric biometric signature (fingerprint image) is used to ensure the unique identity of the object (person) to be authenticated and the spectral information (diffuse reflectance spectrum) is used to ensure that the non-spectrometric biometric signature (fingerprint image) is a genuine signature of the predetermined class of objects (living human beings with fingerprint diffuse spectral characteristics within a predetermined similarity range of predetermined characteristics), spoofing, for example, that uses a non-spectrometric biometric signature (fingerprint image) formed on an object (e.g. copy medium, plastic finger, etc.) not belonging to the predetermined class of objects (living human beings with fingerprint diffuse spectral characteristics within a predetermined similarity range) can be prevented. That is, the spectral information of an object reflects the optical complexity of that object, and the more complex an object is, the more complex the spectral information. In particular, skin or other portion of a living human is a complex biological structure made of different layers with distinct morphologies and optical properties. Thus for example, a diffuse reflectance spectrum obtained from a fingertip includes spectral components of such substances as melanin, hemoglobin, and other constituents of skin, muscle, blood, etc., with which the proportions present, etc. differ among individual persons (see, for example, FIG. 3). The spectral information obtained from a fingertip or other portion of a living human is thus extremely complex and cannot be replicated readily by the use of artificial dummies and prosthetic devices, and especially because in this invention, the non-spectrometric biometric signature of the same portion is acquired for identification, spoofing is made a practically insurmountable task.

Figure 7:
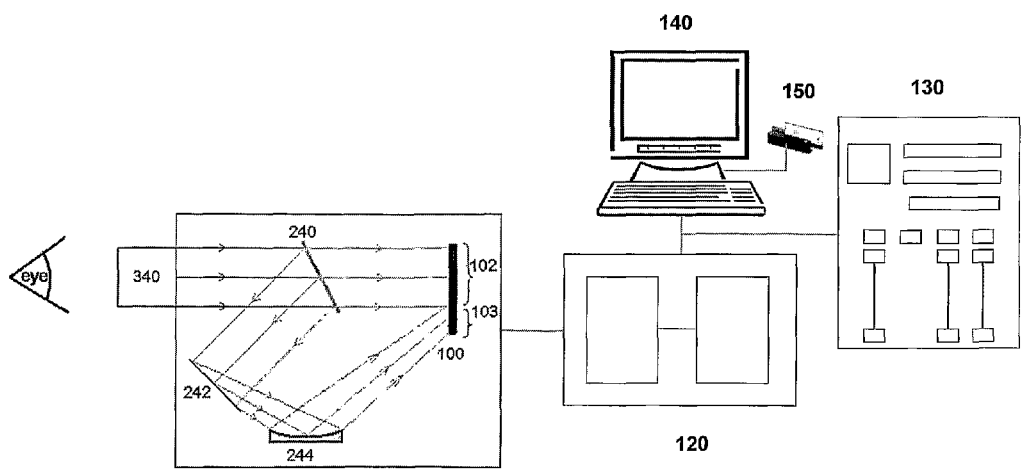
FIG. 7 is a schematic diagram of a basic arrangement of a spectral biometrics enhanced authentication system according to a second embodiment of this invention.

To illustrate a further scope of application of this invention, a second embodiment according to this invention shall now be described. FIG. 7 is a schematic diagram of a basic arrangement of a spectral biometrics enhanced authentication system according to the second embodiment of this invention, which is an iris authentication device 200 that authenticates a person's identity based on his/her iris pattern and biospectral characteristics of his/her iris.

As shown in FIG. 7, this iris authentication device 200 uses the same CCD 100, having the image acquisition portion 102 and the spectrum acquisition portion 103, as that used in the first embodiment. With this authentication device 200, an image of an iris 35 of a person 30 to be authenticated is formed on the image acquisition portion 102 by a lens 340. A portion (10% to 20%) of the light propagating from the iris 35 to the CCD 100 is reflected by a half-mirror 240 and then reflected by a mirror 242 onto a diffraction grating 244, which spectrally disperses and makes the component, reflected by the half-mirror 240, incident on the spectrum acquisition portion 103 of the CCD 100 in a manner such that a reflection spectrum of the iris within a range of 350 nm to 1050 nm can be acquired from each row of the spectrum acquisition portion 103.

The iris image, acquired by the image acquisition portion 102 of the CCD 100, and the iris reflection spectrum, acquired by the spectrum acquisition portion 103, are then handled in the same manner as the fingerprint image and fingertip diffuse reflectance spectrum, respectively, of the first embodiment to obtain an iris pattern and an iris spectral information vector, which are then handled in the same manner as the fingerprint image pattern and the fingertip spectral information vector of the first embodiment to perform the authentication process.

As with the fingertip diffuse reflectance spectrum, the iris reflection spectrum contains information on internal tissue, blood, and other various physiological components of the eye (iris) and thus provides information concerning a person's unique biological spectral signature that cannot be spoofed readily.

The present invention is not limited to the embodiments described above, and various modifications can be made within the scope of the invention.

For example, although the CCD 100, having pixels arranged in 1280 rows and 1024 columns, was used as the image sensor in the embodiment described above, a CCD of any other size may be used or a CMOS device may be used instead as the image sensor. Furthermore, although in the above-described embodiment, the CCD 100 was partitioned into the image acquisition portion 102 of 960×960 pixels at the upper portion and the spectrum acquisition portion 103 of 160×960 pixels at the lower portion, this invention is not restricted thereto and these respective portions may be configured to have sizes besides the above and also be positioned differently (for example, the image acquisition portion 102 may be disposed at a lower portion of the CCD 100 with the spectrum acquisition portion 103 being disposed at an upper portion, or one portion may be disposed at a left side with the other portion being disposed at a right side, etc.). Needless to say, the configuration of the boundary pixels, the data of which are ignored, is not restricted to the pixels of the 32 edge rows at the top and bottom sides, the 32 columns at each of the left and right sides, and the 96 rows between the image acquisition portion 102 and the spectrum acquisition portion 103 of the CCD 100.

Also, although the CCD 100 was partitioned into the image acquisition portion 102 and the spectrum acquisition portion 103 to acquire an image and a spectrum simultaneously with a single image sensor, other configurations for image and spectrum acquisition are also possible. For example, a CCD, CMOS sensor, or other image sensor and a PDA (photodiode array) may be configured to perform image acquisition and spectrum acquisition, respectively, or an image sensor and a spectrometer, which uses a scanning grating and measures a spectrum one point at a time on a point sensor, may be configured to perform image acquisition and spectrum acquisition, respectively. Furthermore, in combination with an image sensor, a sensor having just the same number of photodetecting elements as the number of spectral information to be determined (seven in the case of the above-described embodiments) may be used together with filters, etc. for defining the corresponding wavelength ranges. Because the minimum number of spectral information to be determined is two, two such photo-detecting elements will suffice in the least to put this invention into practice.

Furthermore, an image acquisition portion and a spectrum acquisition portion do not have to be oriented with respect to each other in a spatially separated manner as in the embodiments but may be oriented with respect to each other so as to be separated in time. That is, for example, a non-spectrometric biometric signature image of a biometric signature source may be formed on a certain portion of a CCD and then by means, for example, of a movable mirror, the forming of the image on the CCD may be canceled and a spectrum may be formed on the same portion of the CCD to acquire the spectral information.

However, the use of an image sensor upon partitioning it into an image acquisition portion and an spectrum acquisition portion to acquire an image and a spectrum simultaneously as described above with the embodiments is preferable not only in that the device is thereby made compact, inexpensive, and low in power requirements, but also in that an intensified single spectrum, having a high signal to noise (S/N) ratio, can be obtained by forming multiple identical spectra on the spectrum acquisition portion of the image sensor and performing a binning operation, and an image and a spectrum can thus be obtained rapidly without employing any moving components that may compromise the robustness of the device, etc.

In the above-described embodiments, the identity information of a person to be authenticated are read from an ID card belonging to the person by means of a card reader and this identity information is used to find an associated fingerprint (or iris) pattern and an associated spectral information vector, which are stored in the memory means of the authentication device and are compared with a fingerprint (or iris) pattern and a spectral information vector that are respectively determined from an image and a spectrum acquired by a measurement unit. However, this invention is not restricted thereto and, for example, an embodiment is also possible wherein a fingerprint (or iris) pattern and a spectral information vector of a person to be authenticated are stored in an ID card and this fingerprint (or iris) pattern and spectral information vector are read by a card reader, etc. and then compared with the fingerprint (or iris) pattern and spectral information vector determined from the image and spectrum acquired by the measurement unit to authenticate the person. An embodiment is also possible in which an ID card is not used at all and in which, for example, a fingerprint (or iris) pattern, acquired by a measurement unit, is compared with fingerprint (or iris) patterns in a database, stored in a memory or made accessible online, to determine the identity of a person, and a spectral information vector, acquired by the measurement unit, is compared with spectral information vectors in a database, likewise stored in a memory or made accessible online, to verify that the person belongs to a predetermined class of persons.

Also, although seven values were obtained from seven wavelength ranges within a full spectrum range of 350 nm to 1050 nm to determine a spectral information vector in the embodiment described above, this invention is not restricted to this method of determining a spectral information vector and, for example, the full range of the spectrum, etc. may differ from the range of 350 nm to 1050 nm and include, for example, X-rays, infrared light, etc. However, a wavelength range that is harmful for a subject should be avoided, and for example, the use of UV light (including that in the range of 350 to 400 nm) should be avoided for iris detection.

Also, in place of using the seven values, any number of spectral information values no less than two may be used and, for example, the spectral information of the full spectrum may be used as a spectral information vector. Furthermore, although a standard white plate was used as a calibration reference in the embodiment described above, this invention is not restricted thereto and, for example, a method of normalizing the measured spectrum using a comparatively invariant portion of the spectrum may be employed instead of using a calibration reference.

Also, although cluster analysis is used in the embodiments as a method of analyzing the spectral information, the analysis method of the invention is not restricted thereto and other known pattern recognition methods such as neural networks, fuzzy logic, and linear programming may be employed instead.

Although an I2 lamp 15 was used in the embodiments, this may be replaced by a D2 lamp, lasers, or any other light source that enables the required images and spectra to be obtained as described above. Also, the controller 120 may be arranged to control the light source as well. Although the sheet prism 20 was used as the prism means in the first embodiment, a solid triangular prism may be used instead. However, the use of the sheet prism 20 is preferable in that the optical system 10 can thereby be made compact and thus the fingerprint authentication device 1 as a whole can be made the light source as well. Although the sheet prism 20 was used as the prism means in the first embodiment, a solid triangular prism may be used instead. However, the use of the sheet prism 20 is preferable in that the optical system 10 can thereby be made compact and thus the fingerprint authentication device 1 as a whole can be made compact.

Also, although the embodiments related to a fingerprint authentication system, in which an image and a diffuse reflectance spectrum of a fingertip are acquired, and an iris pattern authentication system, in which an image and a (diffuse+specular) reflectance spectrum of an iris are acquired, were described above, this invention is not restricted thereto and can be applied in likewise manner to other biometrics authentication technologies that measure or detect hand geometry, facial features, retinal print, etc., and employ absorbance spectra, transmission spectra, emission spectra, etc. in place of or in addition to reflectance spectra to obtain the spectral information.

Also, in the embodiments, the non-spectrometric biometric signature is used to determine the unique identity of the biometric signature source and the spectral information is used to verify that the subject to be authenticated belongs to a predetermined class of objects, obviously the non-spectrometric biometric signature and the spectral information that are acquired may also be used for other purposes, such as diagnosis of the state of health of the subject, etc.

Thus although embodiments of this invention have been described above, these are provided only as examples and should not be considered as restricting this invention, the full scope of which is defined by the appended claims. Modifications and improvements that are obvious to those skilled in the art from the above description and the appended claims should thus be regarded as falling within the scope of this invention.

INDUSTRIAL APPLICABILITY

As has been described above, this invention enhances existing biometrics technology with a spectroscopic method to prevent spoofing and thereby provides a higher degree of security in identification and authentication in financial and high security applications, such as ATMs, credit card transactions, electronic transactions, e-passports, airports, international borders, nuclear facilities and other highly restricted areas, etc., in a practical manner that does not create much overhead or inconvenience to users in terms of device, cost, and time.

The invention claimed is:

1. A multifactor authentication system comprising:
a sheet prism or other prism means;
a light source;
a non-spectrometric biometric signature acquisition means, acquiring at least a single fingerprint image of a fingertip of a person to be authenticated and comprising a CCD or CMOS sensor and a first optical system, in turn comprising at least a first lens and forming the fingerprint image on the CCD or CMOS sensor;
a spectral information acquisition means, acquiring at least a single diffuse reflectance spectrum of the fingertip and comprising a photodiode array (PDA) and a second optical system, in turn comprising at least a second lens and a diffraction grating and spectrally dispersing diffusely reflected light from the fingertip onto the PDA; and
an identity determination and verification means, comprising a computer or other information processing means and using the fingerprint image to determine the unique identity of the person to be authenticated and using the diffuse reflectance spectrum of the fingertip to verify that the person to be authenticated is a living human being with predetermined spectral characteristics; and
wherein the fingertip is placed on said sheet prism or other prism means, light from said light source is made incident on the fingertip via the sheet prism or other prism means, and said first optical system forms an image of the spectrally reflected light from the fingertip on the CCD or CMOS sensor at the same time that said second optical system spectrally disperses the diffusely reflected light from the fingertip onto the PDA so that the fingerprint image and the diffuse reflectance spectrum of the fingertip are acquired simultaneously.

2. A multifactor authentication system comprising:
a non-spectrometric biometric signature acquisition means, acquiring at least a single fingerprint image of a fingertip of a person to be authenticated and comprising a first portion of a detecting surface of a CCD or CMOS sensor and forming the fingerprint image on said first portion;
a spectral information acquisition means, acquiring at least a single diffuse reflectance spectrum of the fingertip and comprising a second portion of said detecting surface of said CCD or CMOS sensor that differs from said first portion and spectrally dispersing diffusely reflected light from the fingertip onto said second portion; and
an identity determination and verification means, comprising a computer or other information processing means and using the fingerprint image to determine the unique identity of the person to be authenticated and using the diffuse reflectance spectrum of the fingertip to verify that the person to be authenticated is a living human being with predetermined spectral characteristics.

3. A multifactor authentication system comprising:
a sheet prism or other prism means;
a light source;
a non-spectrometric biometric signature acquisition means, acquiring at least a single fingerprint image of a fingertip of a person to be authenticated and comprising a first portion of a detecting surface of a CCD or CMOS sensor and a first optical system, in turn comprising at least a lens and forming the fingerprint image on said first portion;

a spectral information acquisition means, acquiring at least a single diffuse reflectance spectrum of the fingertip and comprising a second portion of said detecting surface of said CCD or CMOS sensor that differs from said first portion and a second optical system, comprising at least a second lens and a diffraction grating and spectrally dispersing diffusely reflected light from the fingertip onto said second portion; and an identity determination and verification means, comprising a computer or other information processing means and using the fingerprint image to determine the unique identity of the person to be authenticated and using the diffuse reflectance spectrum of the fingertip to verify that the person to be authenticated is a living human being with predetermined spectral characteristics; and wherein the fingertip is placed on said sheet prism or other prism means, light from said light source is made incident on the fingertip via the sheet prism or other prism means, and said first optical system forms the fingerprint image on said first portion of said CCD or CMOS sensor at the same time that the second optical system spectrally disperse the diffusely reflected light from the fingertip onto said second portion of said CCD or CMOS sensor so that the fingerprint image and the diffuse reflectance spectrum of the fingertip are acquired simultaneously.

4. The multifactor authentication system according to any of claims 1 to 3, further comprising:
a storage means for storing the acquired fingerprint image as a registered fingerprint image and storing the acquired fingertip diffuse reflectance spectrum as a registered fingertip diffuse reflectance spectrum; and wherein said identity determination and verification means compares a newly acquired fingerprint image with the stored, registered fingerprint image to determine the unique identity of the fingertip of the person to be authenticated and compares a newly acquired fingertip diffuse reflectance spectrum with the stored, registered fingertip diffuse reflectance spectrum to verify that the person to be authenticated is a living human being with predetermined spectral characteristics.

5. A multifactor authentication system comprising:
a non-spectrometric biometric signature acquisition means, acquiring at least a single image of an iris of a person to be authenticated and comprising a CCD or CMOS sensor and a first optical system, forming the iris image on said CCD or CMOS sensor;

a spectral information acquisition means, acquiring at least a single reflectance spectrum of the iris and comprising a photodiode array (PDA) and a second optical system, in turn comprising at least a diffraction grating and a beam splitter or half mirror and spectrally dispersing reflected light from the iris onto said PDA; and an identity determination and verification means, comprising a computer or other information processing means and using the iris image to determine the unique identity of the person to be authenticated and using the reflectance spectrum of the iris to verify that the person to be authenticated is a living human being with predetermined spectral characteristics; and wherein said first optical system forms the image of the iris on said CCD or CMOS sensor at the same time that said second optical system spectrally disperses the reflected light from the iris onto the PDA so that the iris image and the reflectance spectrum of the iris are acquired simultaneously.

6. A multifactor authentication system comprising:
a non-spectrometric biometric signature acquisition means, acquiring at least a single image of an iris of a person to be authenticated and comprising a first portion of a detecting surface of a CCD or CMOS sensor and forming the iris image on said first portion;

a spectral information acquisition means, acquiring at least a single reflectance spectrum of the iris and comprising a second portion of said detecting surface of said CCD or CMOS sensor that differs from said first portion and spectrally dispersing reflected light from the iris onto said second portion; and an identity determination and verification means, comprising a computer or other information processing means and using the iris image to determine the unique identity of the person to be authenticated and using the reflectance spectrum of the iris to verify that the person to be authenticated is a living human being with predetermined spectral characteristics.

7. A multifactor authentication system comprising:
a non-spectrometric biometric signature acquisition means, acquiring at least a single image of an iris of a person to be authenticated and comprising a first portion of a detecting surface of a CCD or CMOS sensor and a first optical system, forming the iris image on said first portion;

a spectral information acquisition means, acquiring at least a single reflectance spectrum of the iris and comprising a second portion of said detecting surface of said CCD or CMOS sensor that differs from said first portion and a second optical system, in turn comprising at least a diffraction grating and a beam splitter or half mirror and spectrally dispersing reflected light from the iris onto said second portion; and an identity determination and verification means, comprising a computer or other information processing means and using the iris image to determine the unique identity of the person to be authenticated and using the reflectance spectrum of the iris to verify that the person to be authenticated is a living human being with predetermined spectral characteristics; and wherein said first optical system forms an image of the iris on said first portion of said CCD or CMOS sensor at the same time that said second optical system spectrally disperses the reflected light from the iris onto said second portion of the CCD or CMOS sensor so that the iris image and the reflectance spectrum of the iris are acquired simultaneously.

8. The multifactor authentication system according to any of claims 5 to 7, further comprising:
a storage means for storing the acquired iris image as a registered iris image and storing the acquired iris reflectance spectrum as a registered iris reflectance spectrum; and wherein said identity determination and verification means compares a newly acquired iris image with the stored, registered iris image to determine the unique identity of the iris of the person to be authenticated and compares a newly acquired iris reflectance spectrum with the stored, registered iris reflectance spectrum to verify that the person to be authenticated is a living human being with predetermined spectral characteristics.

* * * * *